INVENTOR
HANS O. SCHERENBERG

United States Patent Office 3,418,986
Patented Dec. 31, 1968

3,418,986
METHOD AND APPARATUS FOR PREVENTING INLET VALVE WEAR OF SUPERCHARGED INTERNAL COMBUSTION ENGINES
Hans O. Scherenberg Stuttgart-Heumaden, Germany, assignor to Daimler-Benz Aktiengesellschaft, Stuttgart-Unterturkheim, Germany
Filed Feb. 25, 1966, Ser. No. 530,032
Claims priority, application Germany, Feb. 26, 1965, D 46,619
5 Claims. (Cl. 123—119)

ABSTRACT OF THE DISCLOSURE

A method and apparatus for preventing the impact wear of the inlet valve in supercharged internal combustion engines equipped with poppet valves. Oil dispersed in the air of either the crankcase or cylinder head chamber containing the valve operating mechanisms is connected to the inlet of the supercharger, the supercharger pressure line or immediately adjacent to the inlet poppet valve to coat the valve and prevent wear. A small blower driven by either the cam shaft or crankshaft may be provided to move the air and dispersed oil therein.

Background of the invention

With supercharged internal combustion engines, in contrast to suction engines, excess pressure prevails constantly in the air channel or duct leading to the inlet valve. The air seeks to escape through the valve guide means to the rocker arm space and prevents that any oil, even with a completely enclosed rocker arm space, reaches in the opposite direction the air inlet channel and the valve seat surfaces. An unusually high valve impact wear at the inlet valve of such engines is the consequence.

Summary of the invention

The present invention eliminates this shortcoming. It essentially consists in a crank-case or cylinder-head-hood venting means provided with a line branching off from the vented space which supplies the oil-containing air to the combustion air stream ahead of or upstream of the inlet valve.

Accordingly, it is an object of the present invention to provide a method and apparatus for eliminating, by extremely simple means, the shortcomings and drawbacks encountered with the prior art constructions.

Another object of the present invention resides in the method for lubricating effectively and adequately the inlet valves in supercharged internal combustion engines.

A further object of the present invention resides in a method and apparatus for minimizing the wear at the inlet valves in supercharged internal combustion engines.

Still another object of the present invention resides in a method and apparatus for lubricating the mutual seating surfaces of the inlet valve in supercharged internal combustion engines which is simple in construction, easy to install and extraordinarily reliable and efficient in operation.

Brief description of the drawing

These and further objects, features, and advantages of the present invention will become more obvious from the following description when taken in connection with the accompanying drawing, which shows several embodiments in accordance with the present invention and wherein.

Detailed description of the drawing

Figure 1:
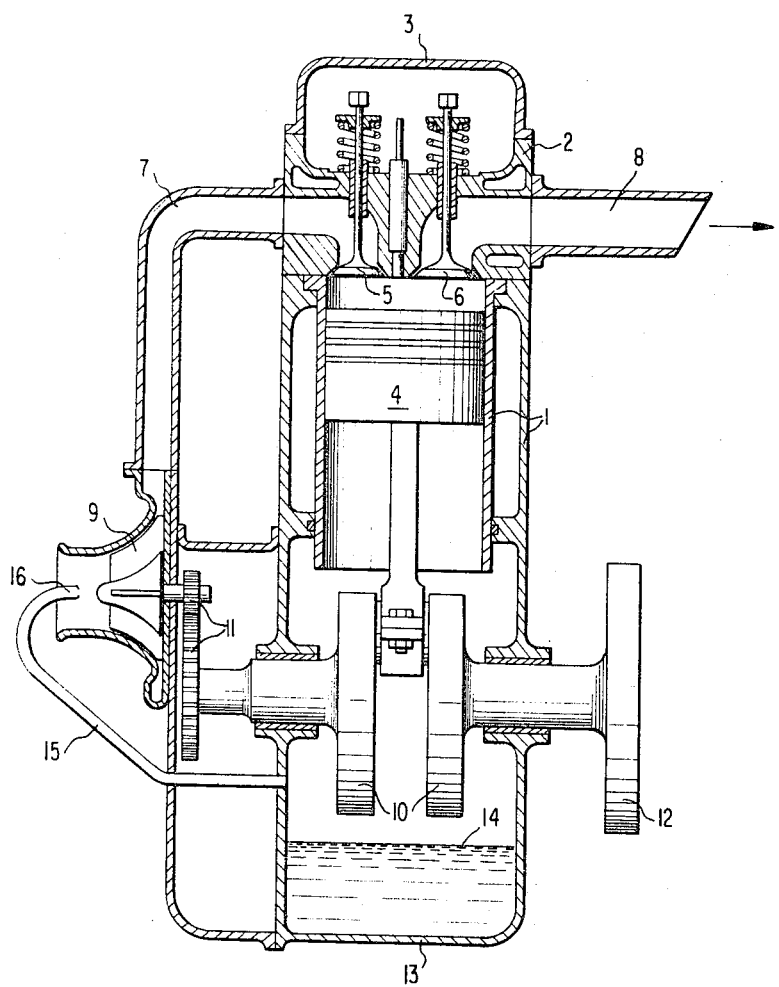
FIGURE 1 is a longitudinal cross-sectional view through an internal combustion engine provided with a crankcase venting and inlet valve seat lubricating system according to the present invention.

Referring now to the single figure of the drawing, the internal combustion engine comprises in the internal combustion engine cylinder 1, a cylinder head 2, a cover hood 3 for the cylinder head 2, a working piston 4 sliding within the cylinder 1, inlet and outlet valves 5 and 6, air inlet and exhaust lines 7 and 8, a conventional supercharger 9, a crankshaft 10 provided with supercharger drive means 11, a fly-wheel 12, and the crankcase 13 of the engine. The engine parts described above may be of any conventional construction.

According to the present invention, the line 15 branches off at a distance above the oil level 14 out of the crankcase housing 13; the line 15 terminates at 16 directly at the suction aperture of the supercharger 9 in the direction of the inflowing air flowing into the same.

The operation of this arrangement is believed obvious from the drawing:

During operation of the engine, the supercharger 9 sucks-in together with the fresh combustion air at the same time also the oil-containing air out of the crankcase 13 of the engine by way of the lines 15, 16 and supplies the same together with the fresh air through the line 7 to the inlet valve 5. At the inlet valve 5, the oil-containing air flows or sweeps over the back of the valve disk and the oil dust or vapor contained therein precipitates in part at the walls of the line 7 and also at the valve 5 with the consequence that an oil film is formed on the seat of the inlet valve which counteracts the great impact wear of the valve 5.

Figure 2:
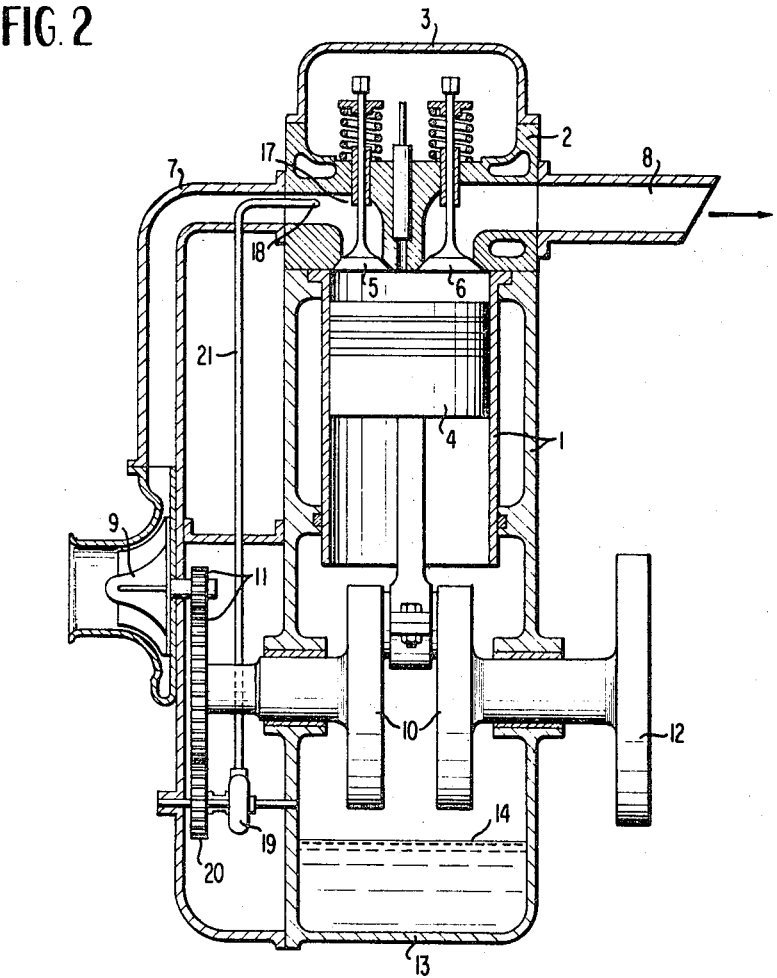
FIGURE 2 is a cross sectional view similar to FIGURE 1 of another embodiment of the present invention.

While I have shown and described above one embodiment in accordance with the present invention, it is understood that the same is not limited thereto, but is susceptible of numerous changes and modifications. Within the scope of the present invention, the sucking-off of the oil-containing air can also take place by means of a small high pressure fan or compressor 19 driven by the crankshaft, as shown in FIGURE 2 wherein identical numerals are used to refer to identical parts previously described with respect to FIGURE 1. In that case, the oil-containing air may also be supplied downstream of the supercharger to the pressure line 7 thereof or directly to the inlet elbow 17 of the cylinder head, as indicated in FIGURE 2 at 18. The compressor 19 is driven by gear 20 in mesh with the larger of the gears 11. The suction line for the compressor 19 extends axially from the compressor through the wall of the crankcase 13; the compressor discharge line is at 21.

Figure 3:
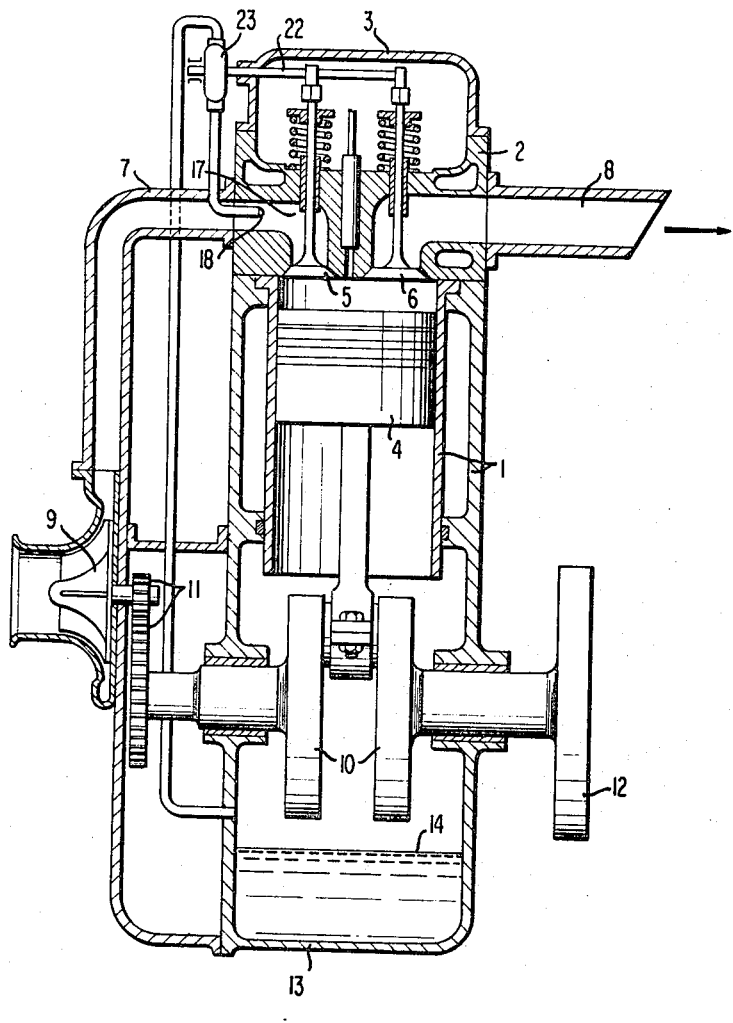
FIGURE 3 is a cross sectional view similar to FIGURE 1 of a further embodiment of the present invention.

Corresponding numerals have been used in FIGURE 3 for corresponding elements. In FIGURE 3, the compressor 23 is driven by the valve cam shaft 22 and otherwise functions in an identical manner as the compressor 19 of FIGURE 2.

In the same manner as described above, a venting means may also be provided in the cylinder head hood 3 in the alternative or additionally thereto, and with the use of a small fan or compressor wheel, the latter may be driven by the cam shaft.

Thus, it is obvious that the present invention is not limited to the details shown and described herein but is susceptible of numerous changes and modifications, and I therefore do not wish to be limited to the details shown and described herein but intend to cover all such changes and modifications as are encompassed by the scope of the appended claims.

I claim:
1. An engine having a crankcase chamber containing oil dispersed in air, a cylinder head chamber containing oil dispersed in air, a combustion air intake conduit, supercharger blower means increasing the pressure of substantially all of the combustion air above atmospheric pressure in the intake conduit and inlet poppet valves in the intake conduit, in combination with the improvement of an apparatus for preventing the wear of the inlet valves by coating them with oil, comprising: at least one of said chambers having an outlet for removing the air and dispersed oil therein from said one chamber; line means for conducting substantially all of the air and dispersed oil therein removed through said outlet and discharging it into the combustion air flow upstream of the inlet valves; said line means terminating in the suction line of the supercharger.

2. An engine having a crankcase chamber containing oil dispersed in air, a cylinder head chamber containing oil dispersed in air, a combustion air supercharger and inlet poppet valves, in combination with the improvement of an apparatus for preventing the wear of the inlet valves by coating them with oil, comprising: at least one of said chambers having an outlet for removing the air and dispersed oil therein from said one chamber; line means for conducting substantially all of the air and dispersed oil therein removed through said outlet and discharging it into the combustion air flow upstream of the inlet valves; venting blower means for forcing the air and dispersed oil therein through said line means, said line means terminating in the pressure line of the supercharger.

3. The combination according to claim 2, wherein said line means terminates a short distance upstream of the inlet valve in the inlet channel of the cylinder head.

4. The combination according to claim 2, further comprising drive means for driving said venting blower means from the crankshaft.

5. The combination according to claim 2, further comprising drive means for driving the venting blower means from the camshaft.

References Cited

UNITED STATES PATENTS

| | | | |
|---|---|---|---|
| 1,875,444 | 9/1932 | Hall | 123—119 |
| 1,876,160 | 9/1932 | Zahodiakin. | |
| 2,271,150 | 1/1942 | Dressler | 123—119 |
| 2,547,587 | 4/1951 | Lowther. | |
| 2,738,779 | 3/1956 | Christianson et al. | 123—41.86 |
| 2,745,392 | 5/1956 | Nallinger | 123—119 |
| 3,157,169 | 11/1964 | Drysdale | 123—41.86 X |
| 3,241,534 | 3/1966 | Kennedy | 123—119 |

AL LAWRENCE SMITH, *Primary Examiner.*

U.S. Cl. X.R.

123—41.86, 188